(12) United States Patent
Gokhale et al.

(10) Patent No.: US 11,498,382 B2
(45) Date of Patent: Nov. 15, 2022

(54) CONTROLLING DAMPER FRICTION EFFECTS IN A SUSPENSION

(71) Applicant: HITACHI AUTOMOTIVE SYSTEMS, LTD., Ibaraki (JP)

(72) Inventors: Akshay Gokhale, Farmington Hills, MI (US); Atsushi Yokoyama, Farmington Hills, MI (US)

(73) Assignee: HITACHI ASTEMO, LTD., Hitachina (JP)

( * ) Notice: Subject to any disclaimer, the term of this patent is extended or adjusted under 35 U.S.C. 154(b) by 408 days.

(21) Appl. No.: 16/754,156

(22) PCT Filed: Oct. 27, 2017

(86) PCT No.: PCT/US2017/058698
§ 371 (c)(1),
(2) Date: Apr. 7, 2020

(87) PCT Pub. No.: WO2019/083542
PCT Pub. Date: May 2, 2019

(65) Prior Publication Data
US 2021/0016620 A1     Jan. 21, 2021

(51) Int. Cl.
*B60G 17/018*     (2006.01)
*B60G 13/06*     (2006.01)
(Continued)

(52) U.S. Cl.
CPC ........... *B60G 17/018* (2013.01); *B60G 13/06* (2013.01); *B60G 17/016* (2013.01);
(Continued)

(58) Field of Classification Search
CPC .... B60G 17/018; B60G 13/06; B60G 17/016; B60G 17/0162; B60G 13/08; B60G 13/10;
(Continued)

(56) References Cited

U.S. PATENT DOCUMENTS

| 4,779,895 A | 10/1988 | Rubel |
| 2003/0204293 A1 | 10/2003 | Shiino et al. |

(Continued)

OTHER PUBLICATIONS

International Search Report of PCT/US2017/058698 date Jan. 9, 2018.

*Primary Examiner* — Yuen Wong
(74) *Attorney, Agent, or Firm* — Mattingly & Malur, PC

(57) ABSTRACT

In some examples, a vehicle suspension for supporting, at least in part, a sprung mass, includes a damper connected to the sprung mass, the damper including a movable piston. The vehicle suspension further includes an actuator and a controller. The controller may be configured to determine a frequency of motion associated with the sprung mass. When the frequency of motion is below a first frequency threshold, the controller may send a control signal to cause the actuator to apply a deceleration force to the sprung mass. Further, when the frequency of motion associated with the sprung mass exceeds the first frequency threshold, the controller may send a control signal to cause the actuator to apply a compensatory force to the sprung mass. For instance, a magnitude of the compensatory force may be based on a friction force determined for the damper.

15 Claims, 10 Drawing Sheets

(51) Int. Cl.
  *B60G 17/016* (2006.01)
  *B60W 40/10* (2012.01)
  *B60W 40/109* (2012.01)
  *B60G 13/08* (2006.01)
  *B60G 13/10* (2006.01)
  *B60W 50/00* (2006.01)

(52) U.S. Cl.
  CPC .......... *B60G 17/0162* (2013.01); *B60W 40/10* (2013.01); *B60W 40/109* (2013.01); *B60G 13/08* (2013.01); *B60G 13/10* (2013.01); *B60G 2202/24* (2013.01); *B60G 2202/242* (2013.01); *B60G 2202/30* (2013.01); *B60G 2204/61* (2013.01); *B60G 2206/41* (2013.01); *B60G 2400/104* (2013.01); *B60G 2400/202* (2013.01); *B60G 2400/41* (2013.01); *B60G 2400/90* (2013.01); *B60G 2500/10* (2013.01); *B60G 2600/182* (2013.01); *B60G 2800/162* (2013.01); *B60G 2800/70* (2013.01); *B60G 2800/916* (2013.01); *B60W 2050/0022* (2013.01); *B60W 2422/40* (2013.01); *B60W 2510/225* (2013.01); *B60W 2510/227* (2013.01); *B60W 2520/125* (2013.01)

(58) Field of Classification Search
  CPC .......... B60G 2202/24; B60G 2202/242; B60G 2202/30; B60G 2204/61; B60G 2206/41; B60G 2400/104; B60G 2400/202; B60G 2400/41; B60G 2400/90; B60G 2500/10; B60G 2600/182; B60G 2800/162; B60G 2800/70; B60G 2800/916; B60G 2300/60; B60G 13/04; B60G 13/14; B60G 13/16; B60G 17/02; B60G 17/04; B60G 17/06; B60G 17/08; B60G 13/02; B60W 40/10; B60W 40/109; B60W 2050/0022; B60W 2422/40; B60W 2510/225; B60W 2510/227; B60W 2520/125; F16F 9/512; F16F 15/002; F16F 9/10
  See application file for complete search history.

(56) References Cited

U.S. PATENT DOCUMENTS

| | | |
|---|---|---|
| 2006/0175785 A1 | 8/2006 | Hamm |
| 2008/0281488 A1 | 11/2008 | Ryu et al. |
| 2013/0166149 A1* | 6/2013 | Liu ................. B60G 17/015 701/37 |
| 2014/0005889 A1 | 1/2014 | Hayakawa et al. |
| 2015/0191067 A1 | 7/2015 | Liu |

* cited by examiner

CONTROLLING DAMPER FRICTION EFFECTS IN A SUSPENSION

TECHNICAL FIELD

This disclosure relates to the technical field of hydraulic damping systems, such as for vehicle suspensions.

BACKGROUND

Conventional hydraulic damping systems, such as those used in vehicle suspensions to dampen road vibrations, may exhibit irregular damping characteristics due to the effects of friction caused, e.g., by the components of the individual dampers. For example, relative motion between damper components, such as between the damper piston and damper cylinder wall and/or between the piston rod and the rod seal, may generate static and dynamic friction forces. The friction forces may be small compared to the hydraulic forces in the damper, but may be significant enough to affect the vehicle ride. The damper friction may also affect the vehicle handling such as during dynamic cornering maneuvers. Further, the damper friction may degrade the on-center feel in the steering system when small steering angles are applied, such as in case of lane changes, or the like.

SUMMARY

Some implementations include a vehicle suspension that compensates for damper friction in some situations and augments damper friction in other situations. In some examples, the vehicle suspension supports, at least in part, a sprung mass, and includes a damper connected to the sprung mass, the damper including a movable piston. The vehicle suspension further includes an actuator and a controller. The controller may be configured to determine a frequency of motion associated with the sprung mass. When the frequency of motion of the sprung mass is below a first frequency threshold, the controller may send a control signal to cause the actuator to apply a deceleration force to the sprung mass. Further, when the frequency of motion associated with the sprung mass exceeds the first frequency threshold, the controller may send a control signal to cause the actuator to apply a compensatory force to the sprung mass. For instance, a magnitude of the compensatory force may be based on a friction force determined for the damper.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Some implementations herein are directed to techniques and arrangements for controlling the effects of friction forces occurring in a hydraulic damper (e.g., a shock absorber) on vehicle ride and handling by controlling the output of an actuator placed in parallel or series with the damper. Thus, some examples herein control the effects of the friction occurring in the damper to provide desired vehicle ride quality and handling by controlling the effects of friction instead of just cancelling out the friction. In some examples herein, the damper friction may be considered as part of a decelerating force similar to the hydraulic damping force that helps dissipate the excess energy in a spring or tire at a sprung and unsprung mass resonance frequency. Thus, some implementations improve the ride comfort of the vehicle by reducing floating and/or shake in the vehicle ride. Further, some implementations may address a frictional excitation force that may manifest at one or more frequencies, such as on smooth roads and/or at medium longitudinal vehicle speeds, which may degrade the ride quality of a vehicle in the frequency range of human sensitivity.

In some examples, the system may include a controller that receives sensor information from one or more vehicle sensors. The controller may use the sensor information at least partially to estimate a relative speed of the hydraulic damper components and/or a motion frequency of the sprung mass. The controller may also receive lateral acceleration information and steering wheel angle information from other vehicle systems, such as via a control area network (CAN) bus of the vehicle.

The controller may control an actuator, such as an active limited force actuator, for counteracting the friction effects in some situations, and for augmenting the friction force in some other situations. A respective actuator may be placed in parallel or series with a respective hydraulic damper at each wheel of the vehicle. In some examples herein, the controller may determine the active force to be applied by the actuator between the vehicle body and the wheel based at least partially on an estimated relative velocity of the damper piston. This active force may be further determined based on the frequency of the sprung mass determined based at least partially on the received sensor information, and/or based on lateral acceleration information received over the vehicle CAN bus from other vehicle systems. Based on the determined active force, the controller sends a control signal to one or more of the actuators for improving the vehicle ride and/or handling.

For discussion purposes, some example implementations are described in the environment of a vehicle suspension. However, implementations herein are not limited to the particular examples provided, and may be extended to other types of service environments, other applications, and so forth, as will be apparent to those of skill in the art in light of the disclosure herein.

Figure 1:
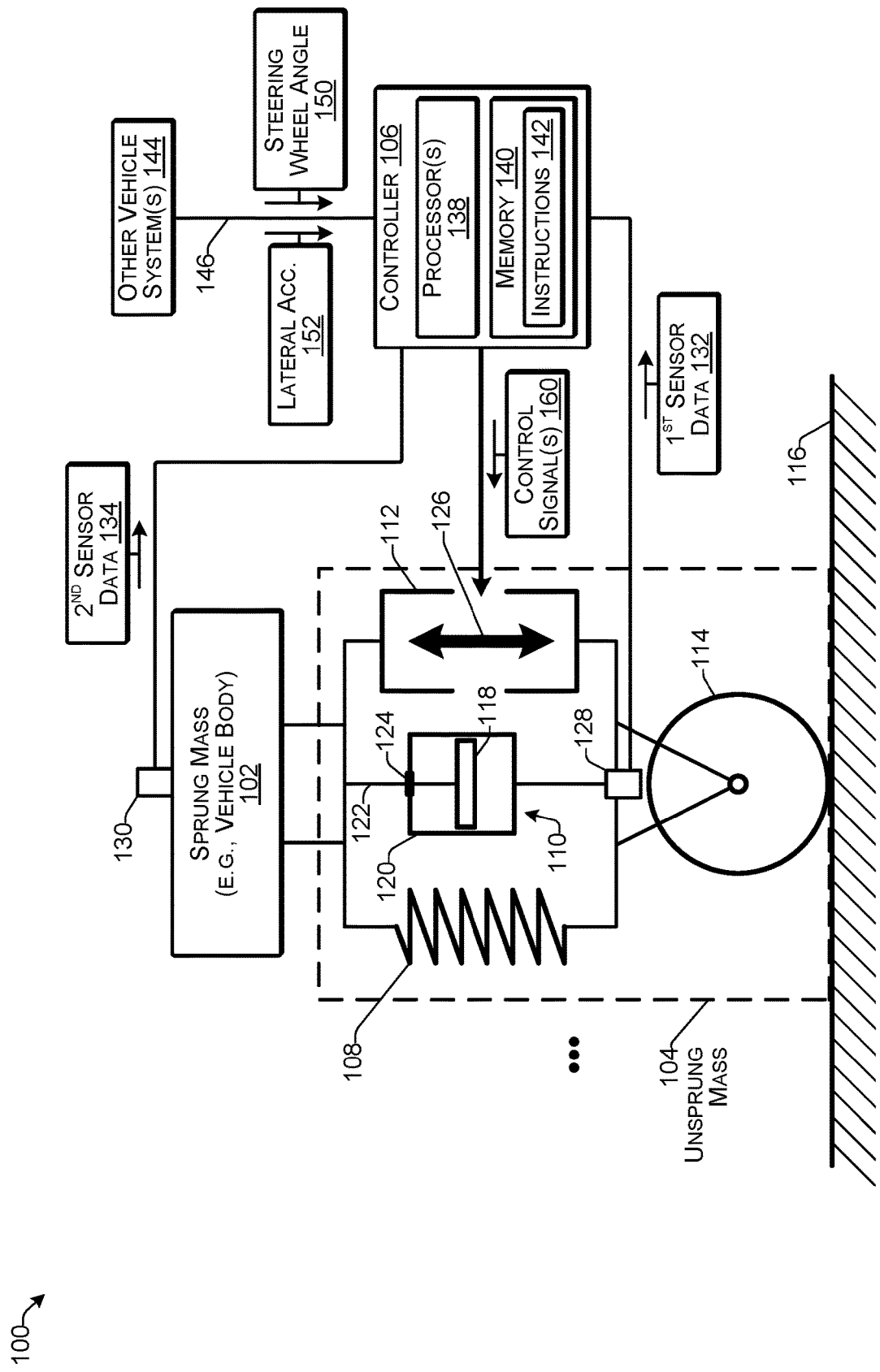
FIG. 1 illustrates an example schematic of an active damper suspension system for a vehicle according to some implementations.

FIG. 1 illustrates an example schematic of an active damper suspension system 100 for a vehicle according to some implementations. The damper system 100 includes a sprung mass 102, an unsprung mass 104, and a controller 106. For example, the sprung mass 102 may include a vehicle body and other components of the vehicle not included in the unsprung mass 104. The unsprung mass 104 may include one or more springs 108, one or more dampers 110, one or more actuators 112, and one or more wheels 114. For example, the spring 108 may suspend the vehicle with respect to the wheel 114 such as for cushioning the ride of the vehicle as the vehicle travels on a surface 116.

Furthermore, the damper 110 may be a hydraulic damper such as a shock absorber that prevents the sprung mass 102 from being oscillated uncontrollably by the spring 108. In the illustrated example, the damper 110 includes a piston 118 that is movable within a cylinder 120, and that includes a piston rod 122 and a piston rod seal 124. The cylinder 120 may be filled with hydraulic fluid, oil, air, or other fluid, as is known in the art. As an example, the contact of the piston 118 with the cylinder 120 and/or the piston rod 122 with the piston rod seal 124 may cause static and dynamic friction that may lead to irregular damping characteristics. Furthermore, while a simple example of a damper 110 is illustrated in FIG. 1, implementations herein are not limited to any particular damper configuration and may encompass any dampers, shock absorbers, or the like, known in the art that are suitable for the uses and purposes described herein.

The wheel 114 may include a tire (not shown in FIG. 1) that may provide further spring response to the unsprung mass 104. However, for simplifying the explanation of the examples herein, the spring effect of the tire may be considered to be included in the spring 108 of the unsprung mass 104 unless specifically discussed otherwise.

The actuator 112 may be made up of one or more individual actuators, such as for being able to exert a force in at least one of an up or down direction, as indicated by arrow 126. Examples of suitable actuators 112 may include a bi-directional solenoid, a hydraulic actuator, a pneumatic actuator, or any other type of actuator capable of exerting a sufficient force as discussed additionally below. Generally, the force generated by the actuator may be much smaller than that used in a conventional active suspension system, e.g., a maximum of 50 newtons per actuator 112, thus, allowing the actuator 112 herein to be significantly smaller than the actuators used in active suspension systems.

In addition, the system 100 may include a first sensor 128 disposed on the unsprung mass 104, and a second sensor 130 disposed on the sprung mass 102. As one example, the first sensor 128 and the second sensor 130 may be accelerometers capable of detecting an oscillation of the unsprung mass 104 and the sprung mass 102, respectively. Accordingly, the first sensor 128 may send first sensor data 132 to the controller 106, and the second sensor 130 may send second sensor data 134 to the controller 106. Furthermore, the sensors 128 and 130 are not limited to being accelerometers, but may include other types of sensors, such as height sensors or the like able to sense and quantify relative motion between the sprung mass 102 and unsprung mass 104.

Additionally, in some examples, there may be a plurality of the unsprung masses 104, each corresponding to separate wheel of the vehicle and an associated suspension system, each including additional one or more springs, dampers, actuators, and sensors. Accordingly, the controller 106 may concurrently control a plurality of the actuators 112 for controlling the ride and handling of the vehicle.

The controller 106 may include one or more processors 138 and a memory 140. The memory 140 may include executable instructions 142 such as a computer program, computer executable code, or the like. The processor(s) 138 may be implemented as one or more microprocessors, microcomputers, microcontrollers, digital signal processors, central processing units, state machines, logic circuitries, application-specific integrated circuits (ASICs) and/or any devices that manipulate signals based on operational instructions. In some cases, the processor 138 may be one or more hardware processors and/or logic circuits of any suitable type specifically programmed or otherwise configured to execute the algorithms and processes described herein. The processor(s) 138 may be configured to fetch and execute computer-readable, processor-executable instructions 142 stored in the memory 140. As one non-limiting example, the processor(s) 138 may be included in a vehicle electronic control unit (ECU) that is connected to one or more other vehicle systems 144, such as via a controller area network (CAN) bus 146 or through other wired or wireless connections.

The memory 140 may include at least one computer-readable medium, such as tangible non-transitory computer storage media, and may include volatile and nonvolatile memory and/or removable and non-removable media implemented in any type of technology for storage of information such as computer-readable processor-executable instructions, data structures, program modules, or other data. The memory 140 may include, but is not limited to, RAM, ROM, EEPROM, flash memory, solid-state storage, magnetic disk storage, optical storage, and/or other computer-readable media technology. Accordingly, the computer-readable media 140 may be computer storage media able to store instructions 142, which may include programs, modules, applications, or other executable code that may be executed by the processor 138. Further, when mentioned, non-transitory memory, otherwise referred to a non-transitory computer-readable media, exclude media such as energy, carrier signals, electromagnetic waves, and signals per se.

The memory 140 may be used to store and maintain functional components that are executable by the processor 138. In some implementations, these functional components comprise instructions or programs that are executable by the processor 138 and that, when executed, implement operational logic for performing the actions and services attributed above to the reporter 104. Functional components of the controller 106 stored in the computer-readable media 140 may include the instructions 142, which may include a series of instructions or other executable code for causing the processor 138 to perform the functions described herein.

In addition, the memory 140 may also store data, data structures and the like, that are used by the functional component(s). Data stored by the computer readable media 140 may include sensor data 132, 134. In addition, the controller may further receive and store data received from sensors associated with the other vehicle systems, such as steering wheel angle 150 and vehicle lateral acceleration 152. Further, the controller 106 may include other logical, programmatic, and/or physical components, of which those described are merely examples that are related to the discussion herein.

As mentioned above, examples described herein are able to control the friction effects of the damper 110 on vehicle ride comfort and the handling. The influence of friction on vehicle ride comfort and handling may depend upon various factors, such as the amount of friction in the system, road surface, tire stiffness, vehicle longitudinal speed, and so forth. The example of FIG. 1 illustrates a quarter vehicle model in which the damper 110 is a passive damper and the actuator 112 is an active limited force actuator. The actuator 112 in this example is disposed in parallel with the damper 110. As discussed additionally below with respect to FIG. 2, the actuator 110 may alternatively be disposed in series with the damper 110 and/or the spring 108.

The sprung mass 102 may generally represent a quarter vehicle body mass in some cases, and the unsprung mass 104 may represent the suspension mass of the vehicle, as discussed above. The actuator 112 is controlled by the controller 106, which sends one or more control signals 160 to the actuator 112 based on received sensor information, such as the first sensor data 132, second sensor data 134, steering wheel angle 150, and lateral acceleration 152. The actuator 112 applies force on the vehicle sprung mass 102 and unsprung mass 104, the amount and timing of which is determined as discussed additionally below. The controller 106 communicates with the sensors 128, 130, and the other vehicle systems 144 to receive the sensor information and estimate one or more parameters used for determining the force to be applied by the actuator 112. The controller 106 determines the desired force to be applied by the actuator 112, and sends a corresponding control signal 160 to the actuator 112. The actual configuration of the control signal 160 may vary depending on the type and configuration of the actuator 112.

Figure 2:
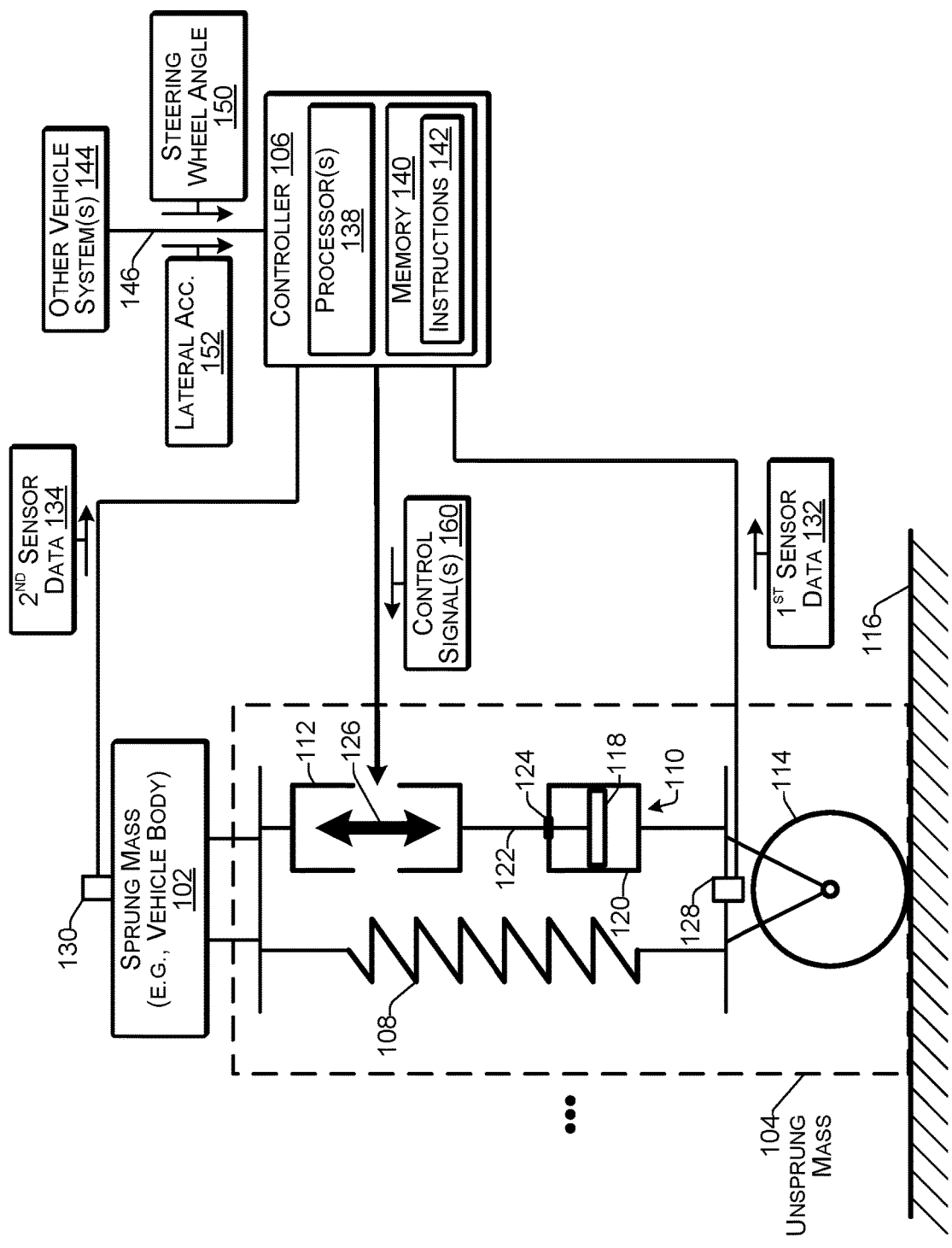
FIG. 2 illustrates an example schematic of an active damper system for a vehicle according to some implementations.

FIG. 2 illustrates an example schematic of an active damper suspension system 200 for a vehicle according to some implementations. In this example, the actuator 112 is placed in series with the damper 110. In the illustrated configuration, the actuator 112 may be controlled by the controller 106 in a manner similar to that discussed with respect to FIG. 1, with the exception that the amount of force to be exerted by the actuator 112 may be different based on whether the actuator 112 is also in series with the spring 108 or in parallel with the spring 108, such as illustrated in FIG. 2.

As another example, the actuator 112 may be located below the damper 110. As still another example, the actuator 112 may be in series with the both the spring 108 and the damper 110, located either above or below the spring 108 and the damper 110. As still another example, a first actuator for applying force in a first direction may be located in series above the damper 110 while a second actuator for applying force in an opposite direction may be located in series below the damper 110. Furthermore, while several example configurations are illustrated and described in this application, numerous other variations and alternative configurations will be apparent to those of skill in the art having the benefit of the disclosure herein.

Figure 3:
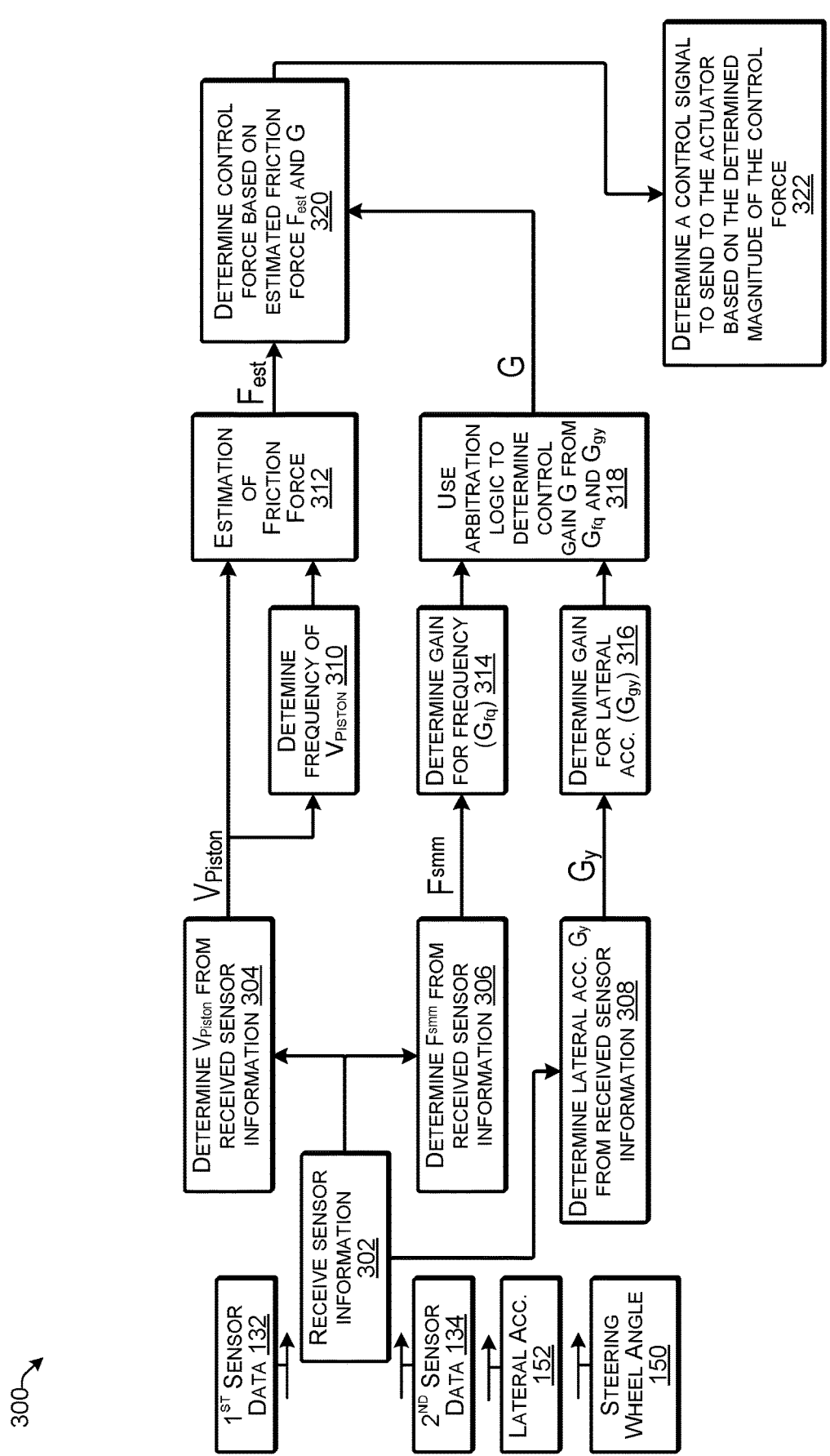
FIG. 3 is a flow diagram illustrating an example process for determining a control force 302 according to some implementations.
Figure 10:
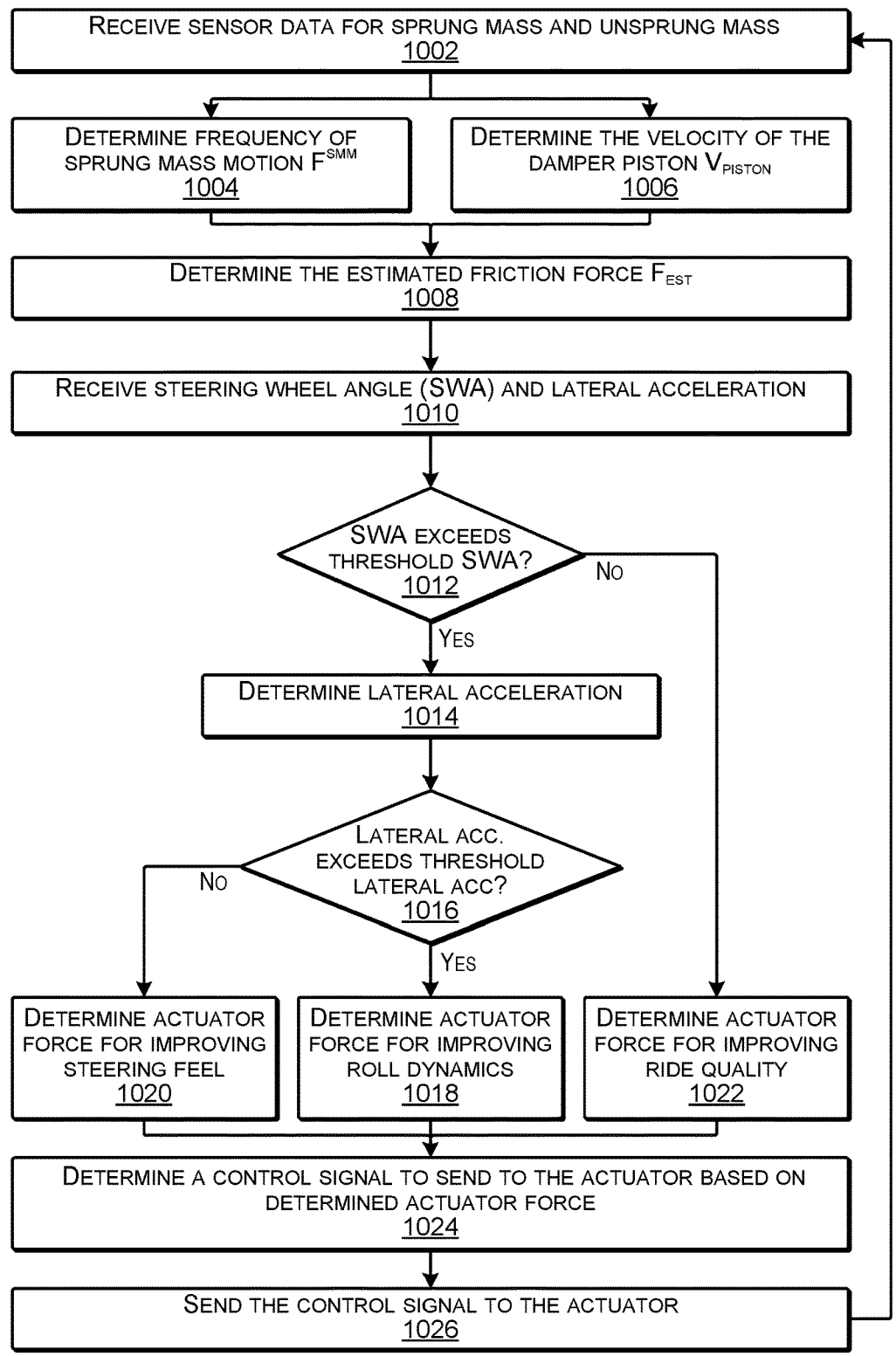
FIG. 10 is a flow diagram illustrating an example process for determining an actuator force for controlling an actuator to at least one of improve steering feel, improve roll dynamics, or improve ride quality of a vehicle according to some implementations.

FIGS. 3 and 10 include flow diagrams illustrating example processes according to some implementations. The processes are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 3 is a flow diagram illustrating an example process 300 for determining a control force according to some implementations. For example, the control force may be exerted by the actuator between the sprung mass and the unsprung mass, e.g., as discussed above with respect to FIGS. 1 and 2. The process 300 may be executed, at least partially, by the controller 106 (not shown in FIG. 3) or other suitable processor(s).

At 302, the controller may receive sensor information such as the first sensor data 132, the second sensor data 134, the lateral acceleration 152, and the steering wheel angle 150, as discussed above with respect to FIGS. 1 and 2.

At 304, the controller may determine the relative piston speed $V_{Piston}$ of the damper piston based on the difference in velocity of the sprung mass and the unsprung mass determined from the first sensor data 132 and the second sensor data 134. In some cases, the controller converts the vehicle sprung mass sensor data (i.e., the second sensor data 134) and the unsprung mass sensor data (i.e., the first sensor data 132) to relative piston speed of the damper by determining a relative difference in motion between the sensors 128 and 130 discussed above with respect to FIG. 1.

At 306, the controller determines a sprung mass motion frequency $F^{smm}$ by comparing the received sensor data 132 and 134 with recent sensor data 132 and 134 stored in memory over time, e.g., received in the last 10-500 milliseconds, for determining the changes in acceleration and velocity of the piston.

At 308, the controller estimates the lateral acceleration $G_y$ from the received steering wheel angle data 150 by know techniques and is updated using lateral acceleration data 152.

At 310, the controller determines the frequency of the piston motion associated with the piston velocity $V_{Piston}$. For example, the frequency of the piston may differ from the sprung mass motion frequency because of the relative motion between sprung mass 102 and unsprung mass 104.

At 312, the controller determines the estimated friction force $F_{est}$ based on the relative velocity of the damper components, i.e., piston velocity amplitude and frequency using the following equations:

$$F_{est} = \text{sign}(V_{piston}) * \left\{ F_c + (F_s - F_c) * e^{-\left(\frac{V_{piston}}{V_{stribeck}}\right)^\delta} \right\} + B * V_{piston}$$

$$F_s = C_1 * \log(|V_{piston}|) + C_2$$

$$F_c = C_3 * \log(|V_{piston}|) + C_4$$

In the foregoing equations, B, $C_1$, $C_2$, $C_3$, and $C_4$ are empirically determined constants based on correlation of a particular damper's experimental data and simulation results. Further, $V_{Stribeck}$ is the Stribeck velocity for the corresponding hydraulic damper and δ is the shape factor for the estimated force and is determined based on correlation of a particular damper's experimental data and simulation results. Further, e is an exponential function and "sign" is the signum function. The static friction force ($F_S$) and Coulomb friction ($F_C$) are functions of piston velocity, as shown above. Accordingly, the friction characteristics such as static-friction-force-to-dynamic-friction-force ratio and hysteretic loop are also related to the velocity of the piston. Further, while one technique for determining the estimated friction force is discussed above, various other techniques will be apparent to those of skill in the art having the benefit of the disclosure herein.

At 314, the controller determines the gain for frequency $G_{fq}$. Additional details of determining the value for $G_{fq}$ are discussed below with respect to FIG. 8. $G_{fq}$ is the tunable gain and is different for different vehicle and damper configurations, and may be determined through the tuning process.

At 316, the controller determines the gain for lateral acceleration $G_{gy}$. Additional details of determining the value for $G_{gy}$ are discussed below with respect to FIG. 9. $G_{gy}$ is the tunable gain and is different for different vehicle and damper configurations, and may be determined through the tuning process.

At 318, the controller uses arbitration logic to determine the control gain G from $G_{fq}$ and $G_{gy}$. The control gain G varies between ±α where α is less than or approximately equal to 1. The control gain is determined based on an estimated frequency of sprung mass motion $F^{smm}$ and lateral acceleration of the vehicle. Additional details of the arbitration logic for determining the control gain are discussed below with respect to FIGS. 8-10.

At 320, the controller determines the control force based on the estimated friction force $F_{est}$ and the control gain G. The control force for controlling the friction effects of the damper may be equal to or less than the friction force. Accordingly, in some cases, the maximum active force applied to the vehicle body (i.e., between the sprung mass and the unsprung mass) may be equivalent to the friction force in the hydraulic damper. Consequently, the energy requirements of the actuator may be relatively small and therefore an actuator with limited power consumption may be used. The control force applied between the sprung mass and the unsprung mass may be proportional to the friction force occurring in the hydraulic damper. As discussed above, the friction force $F_{est}$ in the damper is estimated using the velocity of the piston rod $V_{Piston}$ of hydraulic damper. Friction force characteristics vary with respect to the piston rod motion as discussed additionally below with respect to FIG. 4. As several non-limiting examples, the typical friction force may be around 20-30 newtons (4-7 pounds) for a hydraulic damper. Additional details of determining the control force are discussed below with respect to FIGS. 8-10.

At 322, the controller determines a control signal to send to the actuator based on the magnitude of the control force determined at 320. For example, for a solenoid actuator, the controller may determine an amount of current to be applied to the solenoid for causing the solenoid to apply a desired force of a desired magnitude at a desired timing. In the case of a hydraulic actuator, the controller may subtly determine an amount of hydraulic fluid to be delivered to the hydraulic actuator and so forth. Numerous other variations will be apparent to those of skill in the art having the benefit of the disclosure herein.

Figure 4:
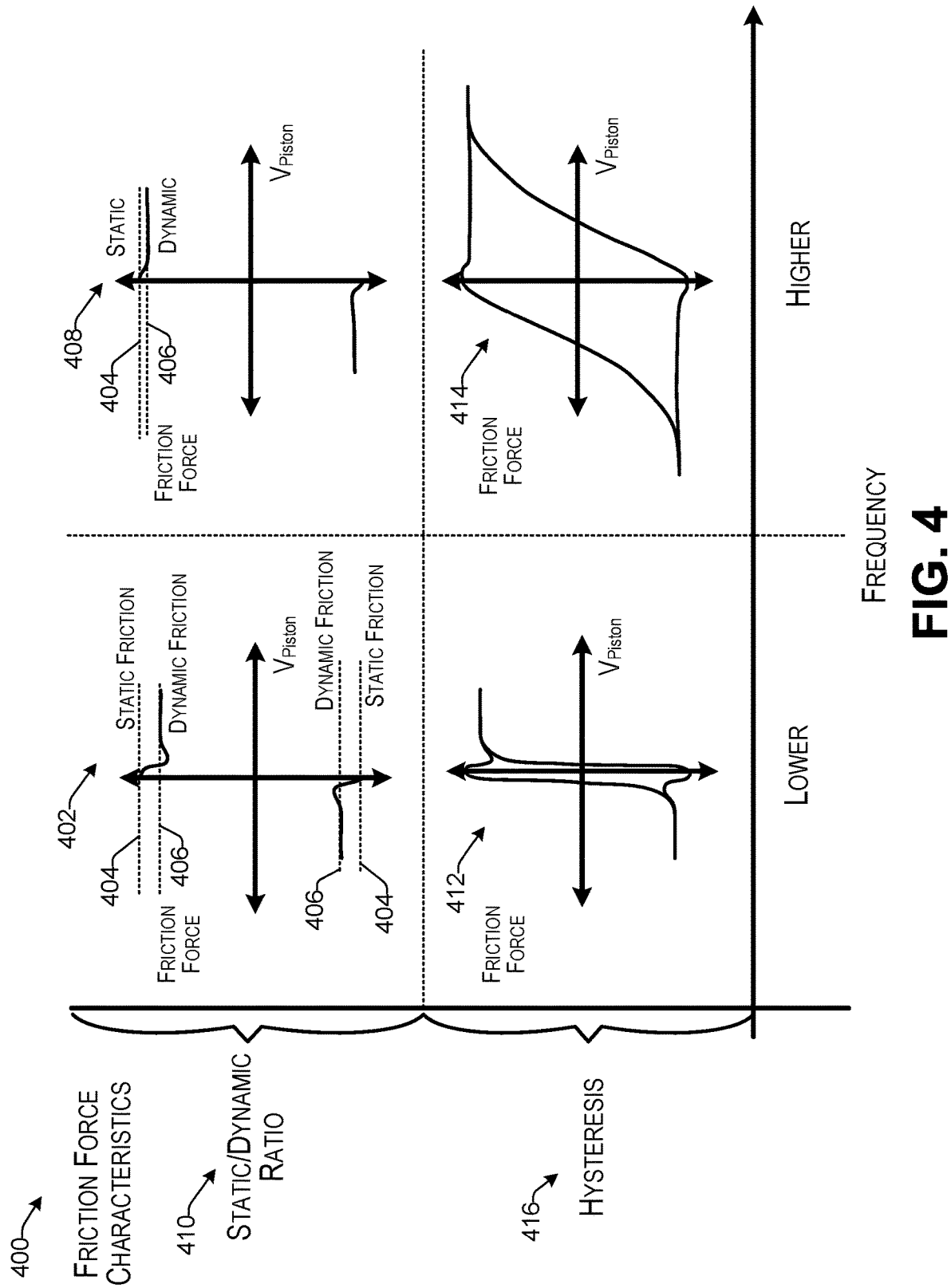
FIG. 4 illustrates an example of friction characteristics at different frequencies according to some implementations.

FIG. 4 illustrates an example of friction characteristics 400 at different frequencies according to some implementations. In the example of FIG. 4, friction force characteristics are shown in four graphs based on frequency of motion, e.g., for lower frequencies or higher frequencies of the damper piston. Each of the four graphs shows friction force as a function of piston velocity $V_{Piston}$ to demonstrate the effects of the friction force at different piston velocities.

As mentioned above, static friction forces occur when the velocity of the piston $V_{Piston}$ is zero or almost the zero, while dynamic friction forces occur when the velocity of the piston $V_{Piston}$ is greater than zero. The upper two graphs in FIG. 4 demonstrate that the ratio of static friction force to dynamic friction force is frequency dependent. For instance, as indicated at 402, at lower frequencies there is a larger difference between static friction 404 and dynamic friction 406 than there is at higher frequencies, as indicated at 408. Accordingly, the ratio of static-to-dynamic friction force 410 is larger in lower frequency regions than the ratio of static-to-dynamic friction force in higher frequency regions.

Furthermore, as demonstrated by the lower two graphs, as indicated at 412 and 414, the hysteric property of the friction force also changes with respect to the frequency of the damper piston. Hysteresis is a phenomenon that may occur when a system is in an oscillatory motion and is not able to trace a return path that is the same as an initial path due to impeding effects, such as friction, which cause a lag, delay, displacement, etc. A comparison of the friction force at 412 with the friction force at 414 indicates that the damper hysteresis 416 increases with an increase in the frequency of the damper piston motion.

Figure 5:
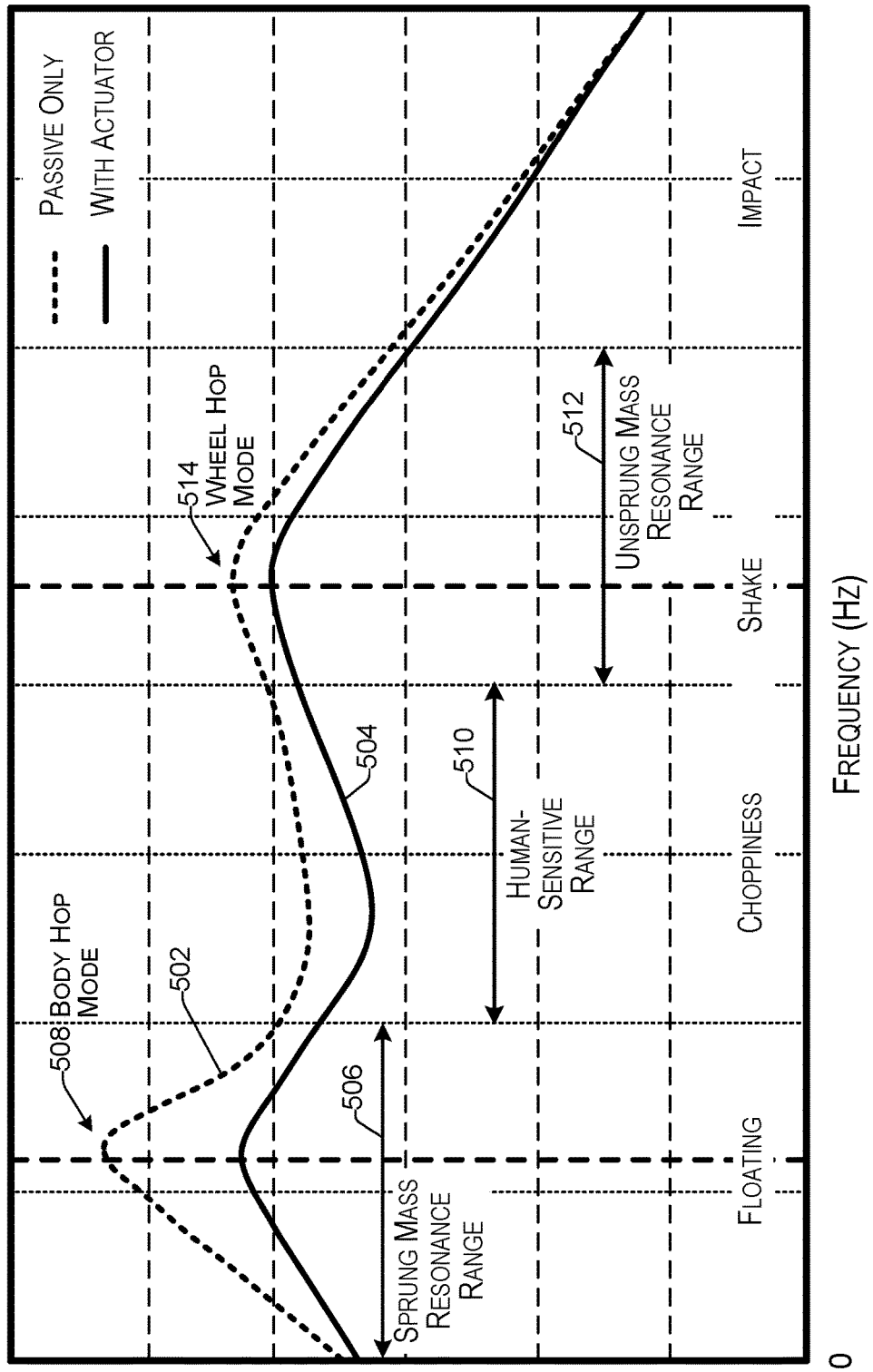
FIG. 5 illustrates an example graph of ride evaluation response versus frequency according to some implementations.

FIG. 5 illustrates an example graph 500 of ride evaluation response versus frequency according to some implementations. FIG. 5 includes a dashed line 502 that corresponds to the ride evaluation index i.e. vehicle body acceleration measured at driver seat floor vs. frequency of the excitation for the suspension system without use of the actuator herein, and solid line 504 that corresponds to the ride evaluation index with the use of the actuator herein according to some implementations.

As indicated by line 504, the vehicle body acceleration is reduced as compared to the passive damper 502 in three regions of interest, namely, sprung mass resonance range 506 (i.e., a lower frequency range) which may include a body hop mode 508 at its peak; human-sensitive range 510 (i.e., a mid-frequency range); and unsprung mass resonance range 512 (i.e. a higher frequency range), which may include a wheel hop mode 514 at its peak. Consequently, implementations herein may provide a significant improvement in vehicle ride comfort over conventional passive systems. For example, the implementations herein may reduce floating in the lower frequency range, reduce choppiness in the mid-frequency range, and reduce shake and impact in the higher frequency range.

Figure 6:
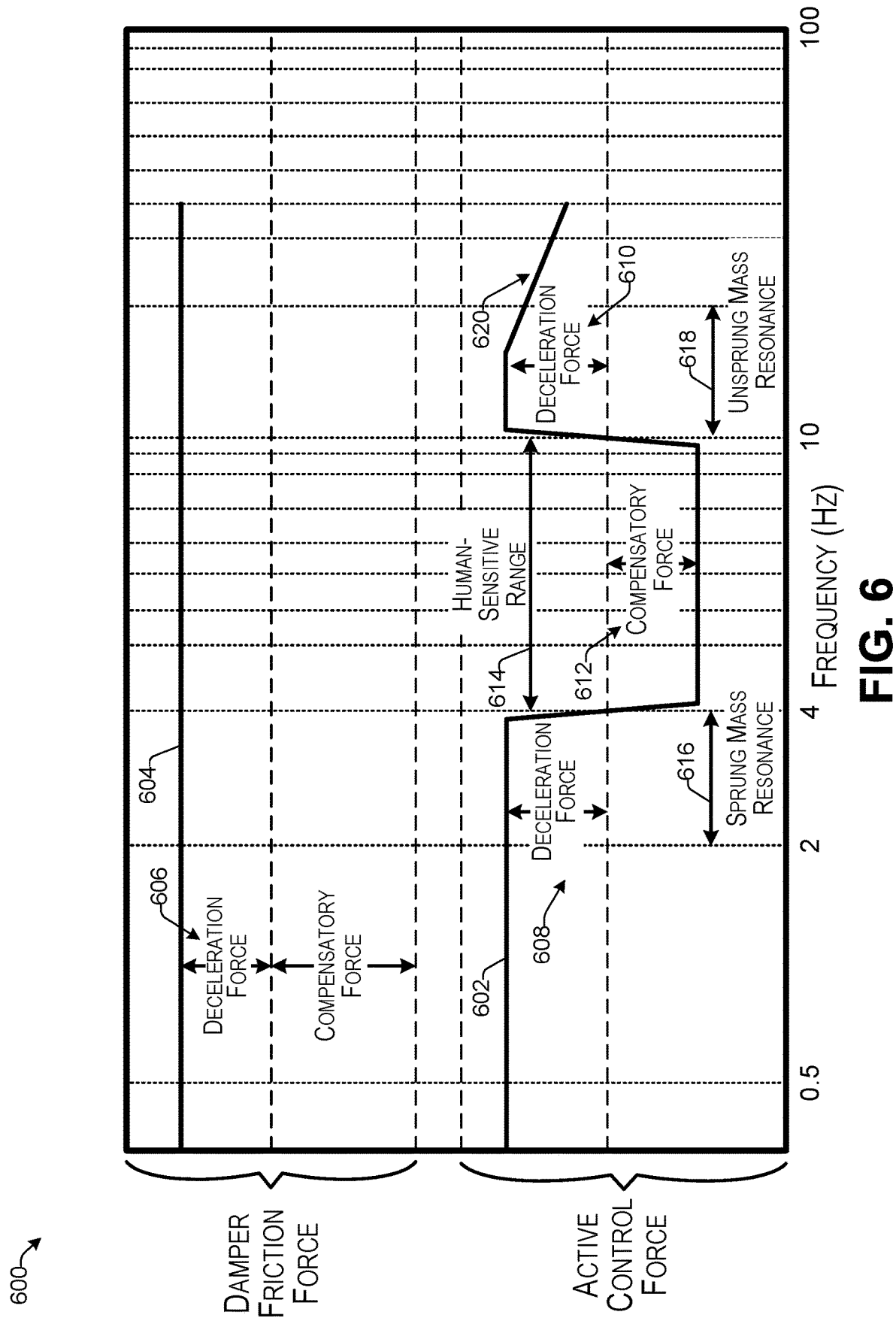
FIG. 6 illustrates an example graph of active force application based on frequency according to some implementations.

FIG. 6 illustrates an example graph 600 of active force application based on frequency according to some implementations. The graph 600 includes a line 602 indicative of the active control force applied by the actuator herein, and a line 604 that is representative of the friction force due to the friction effects of the damper according to some implementations herein. Furthermore, the frequency values provided in the graph 600 and the other graphs herein are for example only, and may vary from system to system depending on numerous factors such as vehicle size, vehicle weight, vehicle configuration, and so forth. Accordingly, implementations herein are not limited to particular values for the frequency ranges described herein. However, in some examples herein, the human sensitive range may be from 4-10 Hz.

The graph 600 demonstrates that the friction force 604 from the damper friction is only able to apply a deceleration force, as indicated at 606, and does not apply any compensatory force. On the other hand, the active control force 602 herein may be applied as both a deceleration force, as indicated at 608 and 610, and as a compensatory force, as indicated at 612, depending on the frequency of the vehicle body motion or other considerations herein as discussed additionally below. For example, in the frequency range 614 that is sensitive to humans, the actuator may be actuated to induce a compensatory force in the system to compensate for or otherwise counteract the friction force in the damper. Accordingly, the compensatory force 612 may reduce the peak force due to friction force that is transmitted between the road and vehicle body (sprung mass). Whereas in the sprung mass resonance frequency range 616 and the unsprung mass resonance frequency range 618, the direction of the actuator force may be selected so that the active force is a deceleration force 608 or 610 that augments the friction force to dissipate the excess energy from the system. Furthermore, at higher frequency ranges, e.g., as indicated at 620, the active control force may be gradually reduced as to avoid unintended effects on ride quality.

Figure 7:
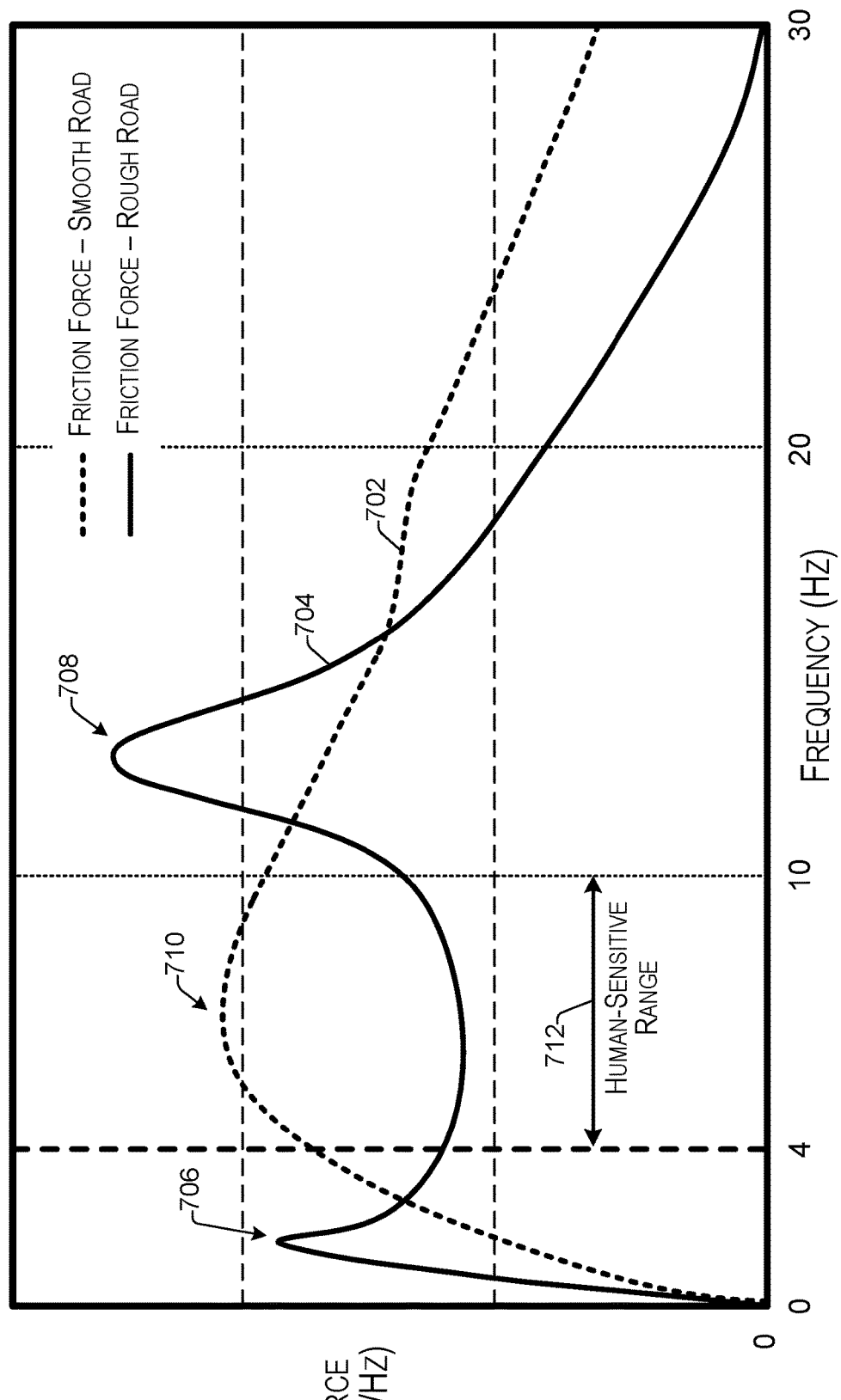
FIG. 7 illustrates an example power spectral density (PSD) graph of friction force versus frequency according to some implementations.

FIG. 7 illustrates an example power spectral density (PSD) graph 700 of friction force versus frequency according to some implementations. The graph 700 includes a dashed line 702 that illustrates an example of the damper friction force as a function of frequency for a smooth road, and a solid line 704 that illustrates an example of the damper friction force as a function of frequency for a rough road. As mentioned above, the influence of the damper friction on vehicle riding comfort depends upon various factors such as the amount of friction in the system, the road surface, tire stiffness, and vehicle longitudinal speed. Damper friction alone is a decelerating force similar to the hydraulic damping force provided by the damper, and helps to dissipate the excess energy in spring or tire at sprung mass resonance frequency and unsprung mass resonance frequency, respectively, and thereby helps to improve ride comfort.

In this example, the friction force 704 for the rough road includes a first peak 706 at the lower frequency range, and a second peak 708 at the higher frequency range. However, the friction force may be negligible as compared to the hydraulic damping force provided by the damper. Also on rough roads, the friction force 704 assists the hydraulic damping force in dissipating the energy in the spring and the unsprung mass at the peak force regions 706 and 708.

On the other hand, the friction force 702 for the smooth road shows a peak 710, such as on smooth roads and at medium longitudinal speeds, which may degrade the riding comfort of the vehicle as the peak 710 lies in the human-sensitive frequency range 712. Accordingly, the active actuator control force discussed above with respect to FIG. 6 may be applied according to implementations herein to help improve vehicle ride comfort by controlling friction effects, such as that demonstrated at 710. Furthermore, as mentioned above, the actuator force may be applied to augment the friction force in the lower frequency range and higher frequency range. Accordingly, the direction of active actuator force applied to the sprung mass may be controlled using, e.g., the estimated frequency of the sprung mass motion for significantly improving the vehicle ride comfort.

Figure 8:
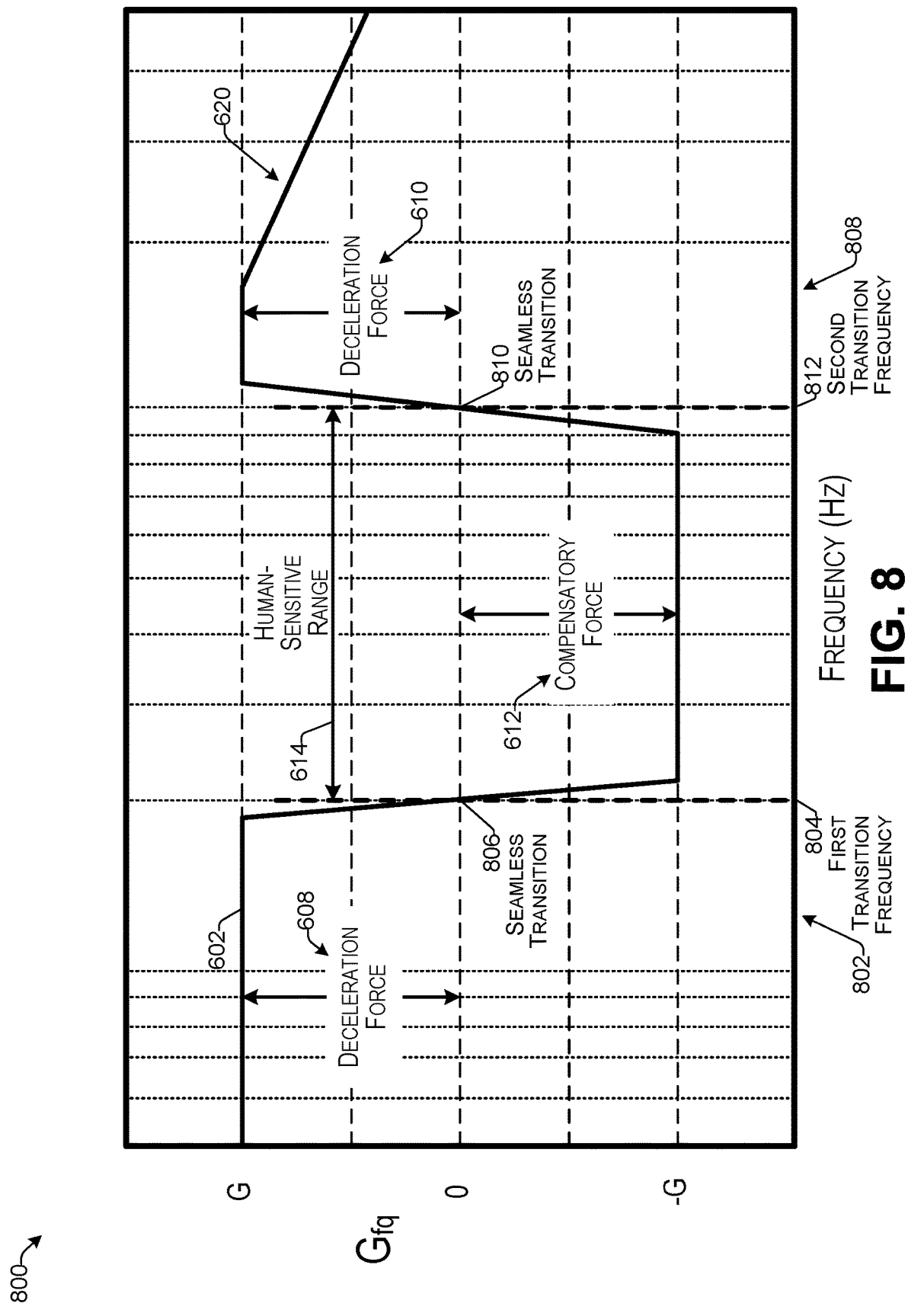
FIG. 8 illustrates an example graph of sprung mass frequency gain $G_{fq}$ as a function of frequency of the sprung mass motion according to some implementations.

FIG. 8 illustrates an example graph 800 of sprung mass frequency gain $G_{fq}$ as a function of frequency of the sprung mass motion according to some implementations. The active control force 602 may be set to be approximately equal to the frequency gain G when used as a deceleration force, as indicated at 608 and 610, and may be set to be approximately equal and opposite of the frequency gain, i.e., −G, when applied as the compensatory force 612.

Furthermore, in this example, the amount of the deceleration force 608 applied by the actuator in the lower frequency range 802 may be gradually decreased as the frequency of the sprung mass motion approaches the human-sensitive range 614. For example, when the frequency reaches the human sensitive range 614, e.g., at a first transition frequency 804, there may be a generally seamless transition 806 at which the actuator ceases to apply the deceleration force 608, and the actuator begins to apply a small compensatory force 612. The compensatory force 612 may be gradually increased as the frequency increases into the human sensitive range 614, such as over the course of a one or two Hz increase. Furthermore, if the frequency of the body motion continues to increase past the human sensitive range 614 into the higher frequencies 808, there may be a second gradual, generally seamless, transition 810 that occurs at a second transition frequency 812, such as over a range of one or two Hz, during which the compensatory force 612 is gradually decreased to zero and the deceleration force is then gradually applied after the transition frequency 812 is reached. Accordingly, as the frequency of the damper piston changes from lower frequency 802 to mid-range 614, and subsequently from mid-range 614, to higher frequency 808, the corresponding frequency gain $G_{fq}$ changes from a positive gain to a negative gain and then back to a positive gain. Thus, at lower frequencies 802, the friction force may be beneficial and is augmented by the actuator force 602, at mid-range frequencies 614, the friction force may be detrimental to ride quality and is counteracted by the actuator force 602, and at higher frequencies 808, the friction force has lesser effect and may be similarly augmented by the actuator force 602 up to a point at which the applied deceleration force 610 is again gradually decreased. This ensures the seamless transitions 806 and 810, and avoids sudden changes in energy of the system, which provides a smooth feeling to the occupants of the vehicle. Thus, the friction effects on vehicle ride quality may be seamlessly controlled.

Furthermore, applying the actuator force for improving ride quality is only one example of how the friction force herein may be compensated and/or augmented. In additional examples, the actuator force may be used for improving the steering and/or handling of the vehicle based on the detected lateral acceleration and the detected steering wheel angle. The characteristics of the friction force and the corresponding actuator force to be applied may be determined based on the gain estimated by the arbitration logic discussed above, e.g., with respect to FIG. 3, and as additionally described with respect to FIG. 10 below. The gain for frequency $G_{fq}$ and the gain for lateral handling $G_{gy}$, may be determined based on the sprung mass motion frequency and the lateral acceleration of the vehicle, respectively. The control gain G may then be estimated by arbitration logic as discussed, e.g., with respect to FIG. 3, using gain $G_{fq}$ and/or gain $G_{gy}$.

The absolute magnitude of the actuator control force applied to the vehicle can be anywhere between 0 and the maximum active force, which may be equivalent to the estimated friction force in the damper and which may be based on the current vehicle dynamics. The direction of the actuator control force applied to the vehicle may be positive or negative based on the current vehicle dynamics. Additionally, sudden changes in control force such as switching from positive to negative control force (e.g., in the case of sudden energy induction) or from negative gain to positive gain (e.g., in the case of sudden loss in energy) may cause undesirable sensation to the vehicle occupant(s). Accordingly, the gain $G_{fq}$ and the gain $G_{gy}$ may be continuous functions of the sprung mass motion frequency and the lateral acceleration of the vehicle, respectively, as discussed with respect to FIGS. 8 and 9. This ensures the seamless transitions and avoids sudden changes in energy of the system, and thereby provides a smoother feeling to the vehicle occupant(s).

In addition, the gain $G_{fq}$ for vehicle riding comfort may be estimated using the frequency of the sprung mass motion $F^{smm}$, as discussed above with respect to FIG. 3. The frequency of sprung mass motion $F^{smm}$ may be estimated by using an arbitrary variable $\sigma^1, \sigma^2, \ldots, \sigma^n$, acceleration and velocity data of sprung mass only, as in following equations:

$$F_1^{smm} = \ddot{x}_b^2 - \sigma_1^2 * \dot{x}_b^2$$

$$F_2^{smm} = \ddot{x}_b^2 - \sigma_2^2 * \dot{x}_b^2$$

$$F_n^{smm} = \ddot{x}_b^2 - \sigma_n^2 * \dot{x}_b^2$$

In above equations, $x_b$ is the displacement of the sprung mass 102 (here x stands for displacement and subscript b stands for sprung mass 102). A concept behind the above estimation is that the output for above equation is zero when the frequency of sprung mass motion $F^{smm}$ is at $\sigma^1, \sigma^2, \ldots, \sigma^n$. To achieve seamless transition at each transition frequency, a 5% frequency dead band may be implemented near the transition frequencies 804 and 812. If the value for above equation is positive, the frequency is more than the transition frequency 804 or 812, and if negative, less than the transition frequency 804 or 812, respectively. Thus using $\sigma^1, \sigma^2, \ldots, \sigma^n$ the frequency of the sprung mass may be estimated. The dominant frequency may be selected in the case of multiple input frequencies. Furthermore, while one example of a technique for determining the sprung mass frequency $F^{smm}$ is discussed above, various other techniques for determining this value will be apparent to those of skill in the art having the benefit of the disclosure herein.

Figure 9:
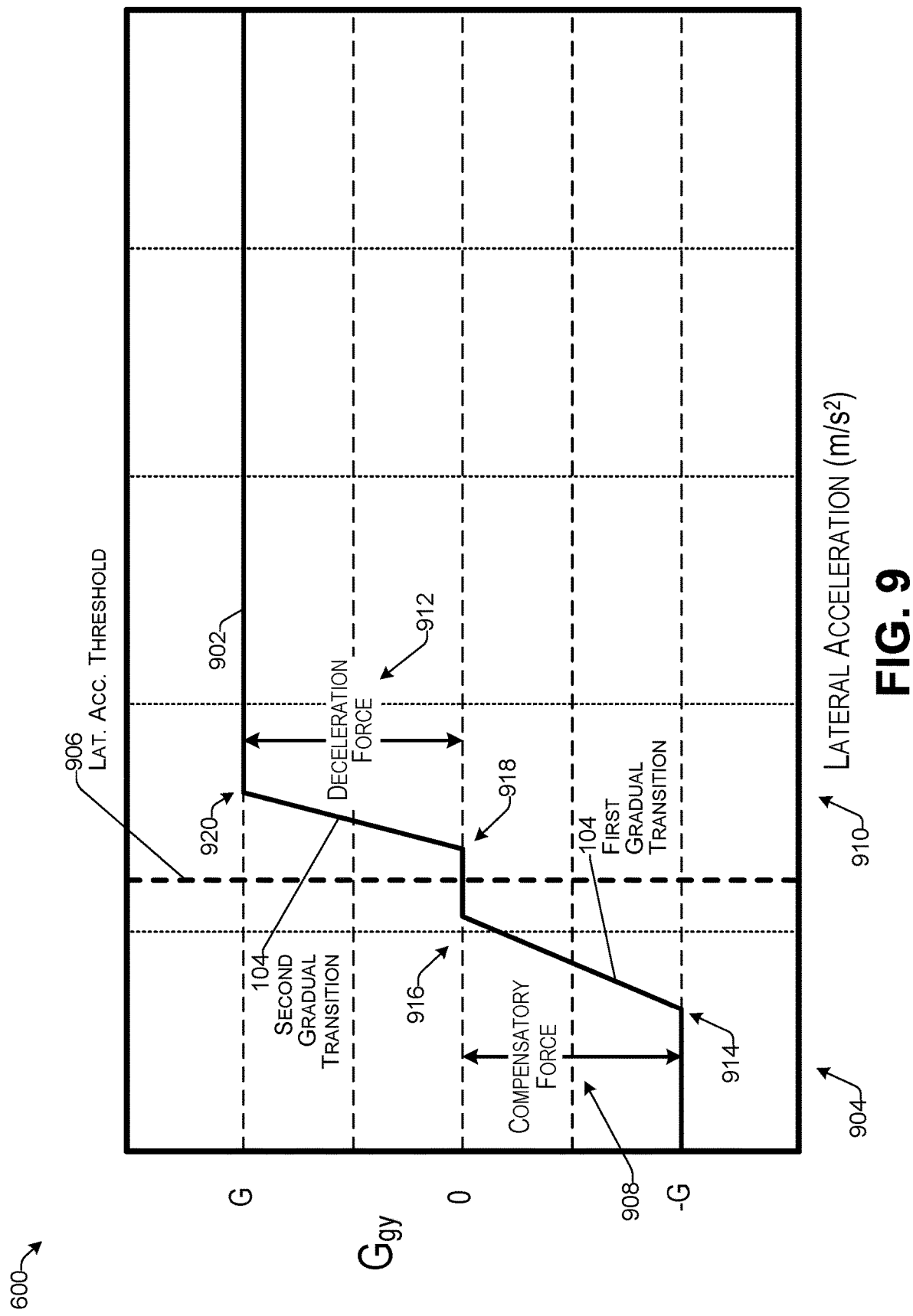
FIG. 9 illustrates an example graph of gain $G_{gy}$ as a function of lateral acceleration according to some implementations.

FIG. 9 illustrates an example graph 900 of gain $G_{gy}$ versus lateral acceleration according to some implementations. As mentioned above, in some examples, the handling and steering feel of the vehicle may be improved by use of the actuator herein when certain conditions are met such as the steering wheel angle exceeding a threshold steering wheel angle and further based an amount of measured lateral acceleration that the vehicle is currently experiencing. Steering feel is a measure of vehicle's initial quick response to a steering input. As static friction is an inertial part of friction force existing due to inertia of the components in the damper, the static friction may generate a delay in vehicle response. If this lag in reaction of the vehicle to steering input by the vehicle operator is greater than expected, the vehicle operator may tend to over steer the vehicle, leading to further correction of the steering input. This operator experience is termed as sluggish response and is undesirable, such as during low speed cornering or changing lanes. Thus to improve the vehicle steering feel, the friction force occurring at or near zero vertical speeds of the damper piston may be compensated by the actuator according to implementations herein.

Furthermore, during larger steering inputs, such as during high speed cornering, the vehicle may tend to roll suddenly due to a sudden increase in lateral acceleration acting on the vehicle. The friction force in this situation may be augmented by the actuator herein to serve as a decelerating force to help in reducing the roll rate of the vehicle, which generates a smaller roll feeling while cornering and thus provides better handling feel to the vehicle.

In the example of FIG. 9, the active control force applied by the actuator is represented by line 902. At lower levels of lateral acceleration, as indicated at 904, i.e., below a lateral acceleration threshold 906, a compensatory force 908 may be applied by the actuator for overcoming the static friction of the damper to improve the steering feel of the vehicle at lower levels of lateral acceleration. Furthermore, at higher levels of lateral acceleration 910, above the lateral acceleration threshold 906, the actuator may apply a deceleration force 912 to help resist body roll of the vehicle at the higher levels of lateral acceleration 910.

In addition, similar to the example discussed above with respect to FIG. 8, the actuator may be operated to provide gradual transitions between the compensatory force 908 and the deceleration force 912 to thereby provide a smooth transition from the compensatory force 908 to the deceleration force 912 and vice versa. For instance, from a first lateral acceleration value 914 to a second lateral acceleration value 916, the compensatory force 908 applied by the actuator may gradually be reduced from −G to zero. Further, from a third lateral acceleration value 918 to a fourth lateral acceleration value on the other side of the lateral acceleration threshold, the deceleration force may gradually be increased from zero to G. The locations of the lateral acceleration values 914-920 and the lateral acceleration threshold 906 may be set based on a desired steering feel and handling response for the vehicle. Accordingly, in this example, the gain $G_{gy}$ is a continuous function of the lateral acceleration of the vehicle. This ensures the seamless transition and avoids sudden changes in energy of the system providing smooth feeling to the vehicle occupant. Thus, the friction effects on vehicle steering and handling can be seamlessly controlled by techniques set forth in this example.

FIG. 10 is a flow diagram illustrating an example process 1000 for determining an actuator force for controlling an actuator to at least one of improve steering feel, improve roll dynamics, or improve ride quality of a vehicle according to some implementations. The process 1000 sets forth one example of arbitration logic that may be used for determining a compensatory or deceleration force to be applied by the actuator for performing at least one of improving steering feel, improving roll dynamics, or improving ride quality. In this example, the arbitration logic is based at least partially on the steering wheel angle and the lateral acceleration of the vehicle; however, other sensor inputs may be used in addition to or as an alternative to these sensor inputs.

Some implementations herein may control the effects of friction force on the vehicle ride, steering, and handling by using an active limited force low cost actuator. Techniques described herein enable control the actuator force magnitude and direction to effectively counteract friction forces in the damper or to augment the effect of the friction forces.

At 1002, the controller may receive sensor data for sprung mass and unsprung mass. For example, the controller may receive the sensor data from the sensors 130 and 128 on the sprung mass and the unsprung mass, respectively, as discussed above, e.g., with respect to FIG. 1. The sensor data may indicate a relative difference in motion between the sprung mass and the unsprung mass, which is indicative of a current velocity of the damper piston.

At 1004, the controller may determine a frequency of the sprung mass motion $F^{smm}$. For example, based comparing on a current velocity and/or acceleration of the damper piston and recently received sensor data indicating immediately previous motion of the damper piston, the controller may determine a current oscillation frequency of the sprung mass.

At 1006, the controller may determine the relative velocity of the damper piston $V_{Piston}$. As mentioned above, based on the received sensor data, the controller may determine a difference in relative motion between the sprung mass and the unsprung mass, which indicates the velocity of the damper piston.

At 1008, the controller may determine an estimated friction force $F_{est}$ based on the piston velocity and the frequency of the sprung mass. An example of a technique for determining the estimated friction force $F_{est}$ is discussed above with respect to FIG. 8. The estimated friction force corresponds to the friction in the damper at the instant in time, and may be counteracted or augmented by the actuator force depending on the frequency of the sprung mass motion and/or the lateral acceleration, as discussed below.

At 1010, the controller may receive steering wheel angle (SWA) information, lateral acceleration information. For example, as mentioned above, these sensor values may be received from other vehicle systems such as over a CAN bus or other communication connection. Further, the controller may determine based on this information whether to apply the actuator force for (1) improving ride comfort, (2) for improving steering feel, or (3) for improving vehicle handling.

At 1012, the controller may determine whether the steering wheel angle exceeds a threshold steering wheel angle. If the steering wheel angle exceeds the threshold, the process continues to block 1014; on the other hand, if the steering wheel angle does not exceed the threshold steering wheel angle, the process proceeds to block 1022.

At 1014, following a determination that the steering wheel angle exceeds the threshold steering wheel angle, the controller may determine the lateral acceleration of the vehicle. As mentioned above, the lateral acceleration may be received from another vehicle system through the can bus.

At 1016, the controller may determine whether the lateral acceleration exceeds a threshold lateral acceleration. For example, if the measured lateral acceleration exceeds the threshold lateral acceleration, then the vehicle has the potential to experience excessive roll. On the other hand, if the lateral acceleration is less than the threshold lateral acceleration then it may be desirable to improve the steering feel of the vehicle. Accordingly, if the lateral acceleration exceeds the threshold, the process proceeds to block 1018; on the other hand, if the lateral acceleration does not exceed the threshold, then the process proceeds to block 1020.

At 1018, when the lateral acceleration exceeds the threshold lateral acceleration, the controller may determine an actuator force for improving roll dynamics. Accordingly, the controller may use the gain $G_{gy}$ discussed above for determining the actuator force to be applied. For improving roll dynamics, the actuator force is applied to augment the effects of the friction force for increasing the resistance to body roll of the vehicle. For instance, when the lateral acceleration value is greater than the lateral acceleration threshold value, the vehicle is assumed to be in cornering, and thus experiencing roll motion. The actuator force may be arbitrated as a decelerating force to the vehicle, which assists the friction force in dissipating energy in the suspension system and thereby reducing the roll rate of the vehicle. The magnitude of the deceleration force may be arbitrated based on the roll rate of the vehicle. In some examples, the roll rate of the vehicle may be estimated using the piston velocity $V_{Piston}$ and the lateral acceleration of vehicle.

At 1020, when the lateral acceleration is not exceed the threshold lateral acceleration and the steering wheel angle exceeds the threshold steering wheel angle the controller may determine an actuator force for improving the steering feel of the vehicle. Accordingly, the controller may use the gain $G_{gy}$ discussed above for determining the actuator force to be applied. For improving steering feel, the actuator force may be applied to counteract the effects of the friction force for decreasing the effect of the damper friction on the steering feel. Accordingly, the actuator force may be arbitrated in magnitude as well as direction to reduce the lag in the vehicle reaction to steering input, thus improving the steering feel. This is achieved by inducing the required amount of energy into the suspension system of vehicle using the actuator to provide a compensatory force, as discussed above with respect to FIG. 9.

At 1022, when the steering wheel angle does not exceed the threshold steering wheel angle, the controller may determine an actuator force for improving ride comfort of the vehicle. Accordingly, the controller may use the gain $G_{fq}$ discussed above for determining the actuator force to be applied. For instance, the actuator force may augment the friction force at lower and higher frequencies, and may compensate or otherwise counteract the friction force at mid-range frequencies, as discussed above, e.g., with respect to FIGS. 5-8.

At 1024, the controller may determine a control signal to send to the actuator based on the determined actuator force. For example, the controller may use a conversion table, a stored algorithm, or the like, to determine an amount of current to be applied to the actuator to cause the actuator to apply a desired force in a desired direction.

At 1026, the controller may send the control signal to the actuator for either counteracting or augmenting the effects of the damper friction on the vehicle suspension. In some examples, the controller may serve as the controller for the actuator and may directly control the amount of current provided to the actuator. In other examples, the actuator may have its own controller and the control signal may indicate to the controller an amount of current to be applied to the actuator. Other types of actuators may be similarly controlled by the controller. Furthermore, numerous other variations will be apparent to those of skill in the art having the benefit of the disclosure herein.

Additionally, in some examples, the vehicle speed (i.e., longitudinal speed) may be taken into consideration when determining whether to apply the actuator force for handling improvement or ride comfort improvement. As mentioned above, the actuator may be placed in parallel or in series with the damper and may induce energy into the system or dissipate energy from the system, and thus is able to improve ride quality and handling for the vehicle operator. Furthermore, as mentioned above implementations herein provide a computationally inexpensive and low cost method for controlling the actuator force, and requires considerable smaller energy consumption than an active suspension, as the maximum force output of the actuator is typically equivalent to the friction force in the system, which may be in the range of 100 to 200 newtons per vehicle. Thus, the implementations herein not only improve vehicle ride in almost all frequency ranges, but also improve vehicle steering feel and handling dynamics. The control method described herein also has low computation and memory costs, thus reducing the cost of the controller. The above described implementations are robust and may be utilize in combination with other active actuators to provide similar ride and handling.

The example processes described herein are only examples of processes provided for discussion purposes. Numerous other variations will be apparent to those of skill in the art in light of the disclosure herein. Further, while the disclosure herein sets forth several examples of suitable systems, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A vehicle suspension system for supporting, at least in part, a sprung mass, the system comprising:
a damper supporting the sprung mass, the damper including a movable piston; an actuator;
a controller configured to perform operations comprising:
determining a frequency of motion associated with the sprung mass;
when the frequency of motion associated with the sprung mass is below a first frequency threshold, sending a control signal to cause the actuator to apply a deceleration force to the sprung mass; and
when the frequency of motion associated with the sprung mass exceeds the first frequency threshold, sending a control signal to cause the actuator to apply a compensatory force to the sprung mass, wherein a magnitude of the compensatory force is based on a friction force determined for the damper.

2. The system as recited in claim 1, the operations further comprising:
determining a lateral acceleration associated with the sprung mass;
when the lateral acceleration is below a lateral acceleration threshold, causing the actuator to apply the compensatory force to the sprung mass; and
when the lateral acceleration exceeds the lateral acceleration threshold, causing the actuator to apply the deceleration force to the sprung mass.

3. The system as recited in claim 2, the operations further comprising:
determining that a steering wheel angle is less than a threshold steering wheel angle; and
based on the steering wheel angle determined to be less than the threshold steering wheel angle, determining the magnitude of the compensatory force to apply to the sprung mass or a magnitude of the deceleration force to apply to the sprung mass based on the frequency of motion associated with the sprung mass.

4. The system as recited in claim 2, the operations further comprising:
determining that a steering wheel angle exceeds a threshold steering wheel angle; and
based on the steering wheel angle exceeding the threshold steering wheel angle, determining the lateral acceleration associated with the sprung mass.

5. The system as recited in claim 2, the operations further comprising:
determining a gain for the frequency associated with the unsprung mass;
determining a gain for the lateral acceleration; and
determining the magnitude of the compensatory force and/or a magnitude of the deceleration force based on the friction force and at least one of the gain for the frequency or the gain for the lateral acceleration.

6. The system as recited in claim 1, the operations further comprising:
determining a velocity associated with the piston; and
determining the friction force based on the velocity associated with the piston.

7. The system as recited in claim 6, the operations further comprising:
receiving first sensor data from a first sensor associated with an unsprung mass including the damper and the actuator;
receiving second sensor data from a second sensor associated with the sprung mass;
and determining the velocity associated with the piston based on at least one of the first sensor data or the second sensor data.

8. The system as recited in claim 1, wherein:
the friction force determined for the damper is determined at least in part based on at static friction between the piston and a cylinder of the damper and Coulomb friction between the piston and the cylinder; and
the magnitude of the compensatory force and a magnitude of the deceleration force are proportional to the friction force determined for the damper.

9. The system as recited in claim 1, the operations further comprising:
determining a lateral acceleration associated with the sprung mass;
when the lateral acceleration is below a lateral acceleration threshold, causing the actuator to apply the compensatory force to the sprung mass; and
gradually decreasing the compensatory force as the lateral acceleration increases toward the lateral acceleration threshold.

10. The system as recited in claim 9, the operations further comprising:
causing the actuator to cease applying the compensatory force before the lateral acceleration reaches the lateral acceleration threshold; and when the lateral acceleration exceeds the lateral acceleration threshold, causing the actuator to apply a gradually increasing deceleration force to the sprung mass until reaching a deceleration force proportional to the friction force.

11. The system as recited in claim 1, the operations further comprising:
   causing the actuator to gradually decrease the deceleration force as the frequency of motion associated with the sprung mass increases toward the first frequency threshold; and
   causing the actuator to apply the compensatory force as gradually increasing when the frequency of motion associated with the sprung mass exceeds the first frequency threshold until reaching the magnitude based on the friction force.

12. The system as recited in claim 1, the operations further comprising causing the actuator to gradually decrease the compensatory force as the frequency of motion associated with the sprung mass increases toward a second frequency threshold.

13. A method of operating a vehicle suspension supporting, at least in part, a sprung mass, the vehicle suspension including a damper, the method comprising:
   determining, by a controller, a frequency of motion associated with the sprung mass;
   when the frequency of motion associated with the sprung mass is below a first frequency threshold, sending a control signal to cause an actuator to apply a deceleration force to the sprung mass; and
   when the frequency of motion associated with the sprung mass exceeds the first frequency threshold, sending a control signal to cause the actuator to apply a compensatory force to the sprung mass, wherein a magnitude of the compensatory force is based on a friction force determined for the damper.

14. The method as recited in claim 13, further comprising:
   determining a lateral acceleration associated with the sprung mass;
   when the lateral acceleration is below a lateral acceleration threshold, causing the actuator to apply the compensatory force to the sprung mass; and
   when the lateral acceleration exceeds the lateral acceleration threshold, causing the actuator to apply the deceleration force to the sprung mass.

15. A non-transitory computer-readable medium storing instructions which, when executed by one or more processors associated with a vehicle suspension, program the one or more processors to perform operations comprising:
   determining a frequency of motion associated with a sprung mass supported, at least partially, by the vehicle suspension;
   when the frequency of motion associated with the sprung mass is below a first frequency threshold, sending a control signal to cause an actuator to apply a deceleration force to the sprung mass; and
   when the frequency of motion associated with the sprung mass exceeds the first frequency threshold, sending a control signal to cause the actuator to apply a compensatory force to the sprung mass, wherein a magnitude of the compensatory force is based on a friction force determined for a damper included in the vehicle suspension.

* * * * *